June 5, 1923.

W. C. PETERS

LOCK NUT

Filed Feb. 1, 1922

INVENTOR:
Walter Clay Peters
BY Wm Wallace White
ATTY.

June 5, 1923. 1,457,455
W. C. PETERS
LOCK NUT
Filed Feb. 1, 1922 2 Sheets-Sheet 2

INVENTOR:
Walter Clay Peters
By Wm Wallace White
ATTY.

Patented June 5, 1923.

1,457,455

UNITED STATES PATENT OFFICE.

WALTER CLAY PETERS, OF GRAFFHAM, PETWORTH, ENGLAND.

LOCK NUT.

Application filed February 1, 1922. Serial No. 533,216.

*To all whom it may concern:*

Be it known that I, WALTER CLAY PETERS, subject of the King of Great Britain, residing at The Brook, Graffham, Petworth, in the county of Sussex, England, have invented new and useful Improvements in Lock Nuts, of which the following is a specification.

This invention relates to lock nuts of the kind in which the nut is formed in two screw threaded portions longitudinally interconnected by a conically divergent spigot on the one part being located in a conically undercut socket in the other part, thus constituting a normally inseparably interconnected twin nut, the two portions of which are relatively rotatable.

Nuts of this type are described and illustrated in the specification of United States Patent No. 996133.

Locking of such an inter-dovetailed lock nut is effected by turning the two portions relatively to each other so that they tend to approach one another in screwing along the thread of the bolt, like an ordinary nut locked by a second nut.

However, also on turning the two portions of the twin nut relatively to each other so that they tend to separate screwing in opposite directions along the thread of the bolt, the twin nut becomes jammed on the bolt.

Externally the twin nuts generally look like two ordinary superposed nuts, hence an operator, unaware that he is dealing with an interconnected twin nut, in attempting to remove such a twin nut from a bolt, is liable to continue turning the outer portion of the nut beyond the unlocked position into the alternative jamming position damaging the fine adjoining ends of the two portions of the nut. By exerting excessive force the two portions of the nut may even be torn asunder.

The object of the present invention is to provide means for preventing the jamming of a twin lock nut of the above described type, by over-running the unlocked position on being unscrewed.

For this purpose, according to the present invention, the arrangement of the two screw threaded longitudinally interconnected portions of the twin nut is such that whilst they have absolute freedom to turn relatively to each other in the direction to approach one another along the thread of the bolt, relative turning in the reverse direction is precluded beyond the unlocking position, wherein the threads of the two portions are situated along the same helical line.

In other words, in screwing up the nut, on arrest of the inner of the two portions of the nut against the work, the outer portion can be continued to be turned until the locking is effected, but on unscrewing the nut, when the outer portion has been turned sufficiently to unlock the nut it cannot be turned any further in the unscrewing direction without being accompanied by the inner portion, or portion nearer the work.

This is effected by the encounter of abutments between the two portions of the nut when the screw threads of each are in alignment.

The above described function of the invention involves a further advantage, which is that as the turning to unlock cannot be pursued beyond the unlocking position, both unlocking and unscrewing can be effected by a single spanner applied solely to the outer portion of the nut, the inner portion being picked up and participates in the rotation when the abutments meet.

The mutual abutments may be a ball in a hemispherical recess in the meeting face of one portion of the nut protruding into a segmental circular groove in the meeting face of the other portion of the nut, one end of the groove being encountered by the ball when the two portions are turned relatively to each other from the locked to the unlocked position, and the other end of the groove being so remote that ample relative angular movement to effect locking is permitted.

Alternatively to the ball, a pin or stud may be employed. The pin may slide in the one nut and over the meeting face of the other, engaging an abrupt shouldered inclined notch therein, when the nuts are unlocked.

The socket portion of the nut need have but one or two convolutions of the thread, although as its depth accommodates the spigot of the spigot portion, it preferably has a far deeper spanner surface than the latter, as above set forth.

A twin lock nut according to the invention is illustrated on the accompanying drawing, in which:—

The twin nut is composed as usual of a spigot-bearing portion $a$, and a socketed portion $b$, the divergent spigot $c$ being held in the undercut socket $d$, whereby the two portions $a$ and $b$ are inseparably held together but can rotate relatively.

The spigot $c$ is expanded to fit the socket $d$ by forcing a tapered drift through an initially conical bore of the spigot, or in any other well known manner.

Figures 3, 4:
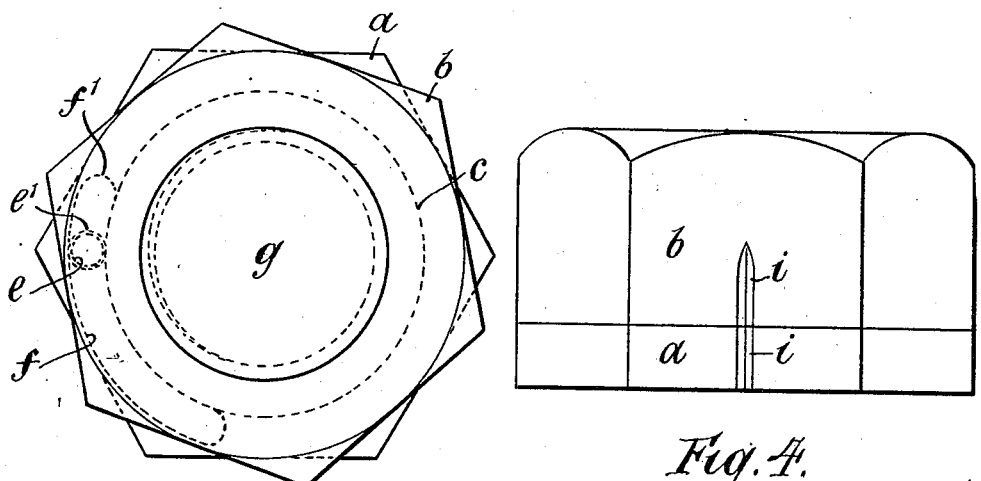
Fig. 3 is a plan corresponding to Fig. 1, showing the outer portion of the twin nut turned relatively to the inner portion, to lock the nut on the bolt.
Fig. 4 is an elevation of the nut as viewed at right angles to Fig. 1.

$e$ is a ball located in a hemispherical recess $e^1$ in the meeting surface of the portion $a$ of the nut and protruding into a segmental circular groove $f$ in the meeting surface of the portion $b$ of the nut. The ends of the groove $f$ are so located that the two portions of the nut can be turned relatively to each other in a direction to approach one another along the thread of a screw bolt $g$, and thus permit the two portions to lock mutually like two ordinary separate nuts as shown in Fig. 3. However, the groove $f$ is so located that on the two portions $a$ $b$ of the nut being turned back into the unlocked position, an end $f^1$ of the groove $f$ abuts against the ball $e$ and arrests further relative rotation of the two portions $a$, $b$, which must then turn together in being unscrewed off the bolt $g$.

As rotation of either portion $a$ or $b$ of the nut in the unscrewing direction brings the ball $e$ and respective end $f^1$ of the groove $f$ into abutment as soon as the screw thread of both are in line, i. e. the unlocked position, further rotation in the unscrewing direction of the portion $b$ will entrain the other portion $a$ to accompany same. Hence spanner surfaces or flats of ample depth need be provided on the outer portion $b$ only, and the exposed portion of $a$ can be quite narrow, being merely sufficient to be engaged by a spanner overlapping both portions $b$ and $a$, should the friction between the two portions be insufficient to cause them to turn as one in being screwed on along the thread of the bolt.

On the portion $a$ encountering the work, its rotation will be arrested, and continued turning of the portion $b$, permitted by the groove $f$, will lock the two portions $a$ $b$ against one another on the bolt $g$.

Figures 1, 2:
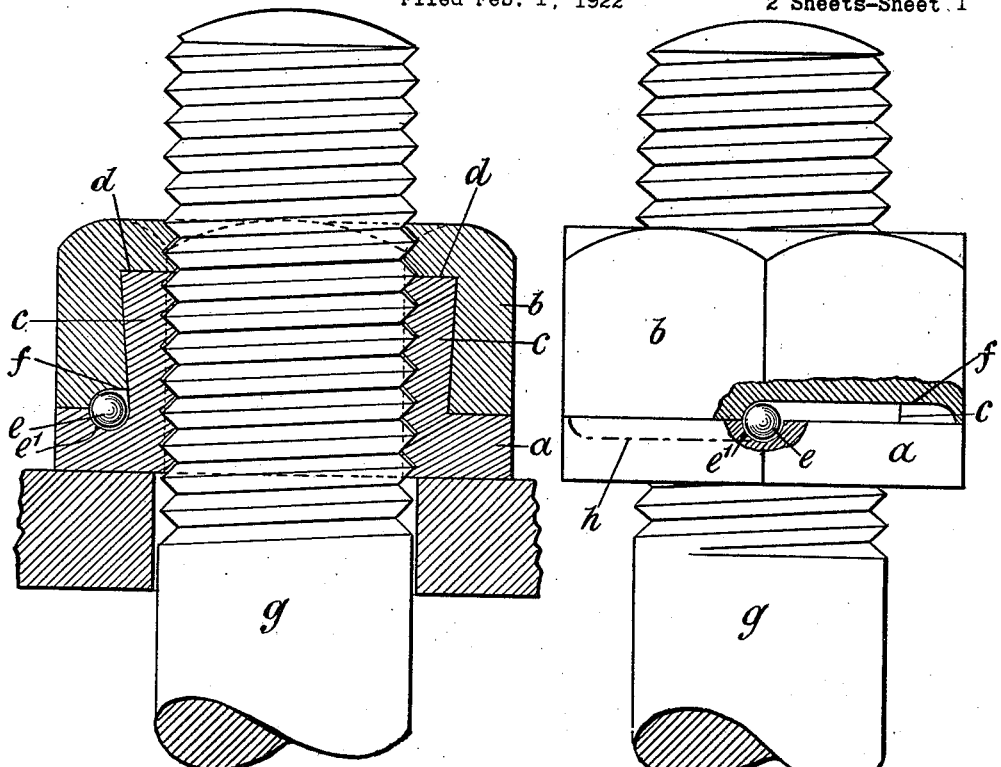
Fig. 1 is a longitudinal section taken across the angles, of the twin nut on a bolt.
Fig. 2 is a corresponding elevation partly in section of the nut on the bolt as viewed at right angles to Fig. 1.

Instead of the ball $e$ being located in a hemispherical recess $e^1$ in $a$ which prevents displacement of the ball in the circumferential direction of the nut, the hemispherical recess $e^1$ may be extended into a groove, as shown in dot dash lines at $h$ in Fig. 2, extending in the reverse direction to the groove $f$, which latter may be correspondingly shortened, being thus in effect divided and contained in both portions $a$, $b$ of the nut.

Figure 5:
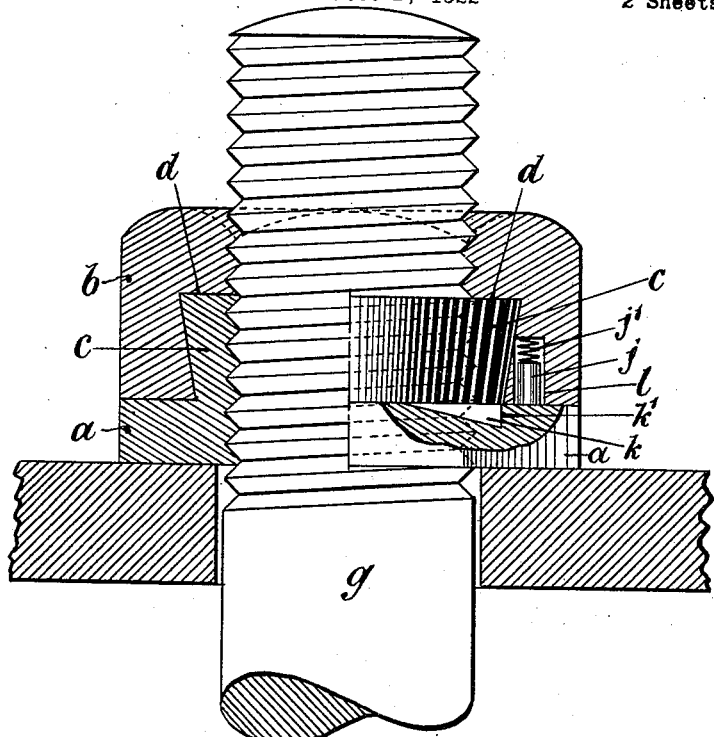
Fig. 5 is a sectional elevation of a modified twin nut.
Figure 6:
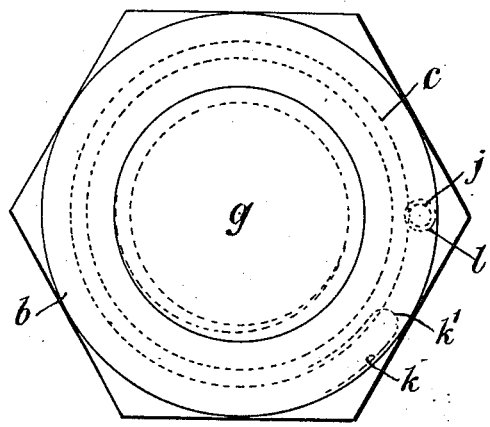
Fig. 6 is a plan thereof.

In the modification illustrated by Figs. 5 and 6, a pin $j$ is substituted for the ball, and a ratchet notch $k$ is substituted for the groove $f$.

The ratchet notch $k$ has an abrupt shoulder $k^1$ in the unlocking direction and a base inclined to meet the meeting surface of the portion $a$ in the locking direction. One end of the pin $j$ tends, by a spring $j^1$ or by gravity, to issue from a bore $l$ in the portion $b$ of the nut in which it is located. When the two portions $a$, $b$ of the nut are in the unlocked position the pin $j$ protrudes into the ratchet notch $k$ and, by bearing against the abrupt shoulder of this notch, entrains the portion $a$ to move with the portion $b$ when the latter is turned in the unscrewing direction. On the other hand the portion B can be turned relatively to the portion $a$ in the locking direction, as in such case the inclined base of the notch $k$ causes the pin $j$ to ride upon and to slide around on the meeting face of the portion $a$.

$i$, $i$ are marks provided, if desired, on the outside of the nut to indicate by their coincidence, that the threads of each portion are in alignment.

It should be observed that even if the nut be screwed on the bolt $g$ with the portion $b$ next to the work, the then outer portion $a$ will entrain the then inner portion $b$ on reaching the unlocked position, as the ball $e$ or pin $j$ will also then encounter the end $f^1$ of the groove $f$ or the abrupt shoulder of the notch $k$.

I claim:

1. In a twin lock nut, a nut having an undercut socket, a second nut, a conically divergent spigot on said second nut fitting said socket, and a ball located in the meeting face of one said nuts and entered in a segmental groove in the meeting face of the other said nut.

2. In a twin lock nut, a nut having an undercut socket, a second nut, a conically divergent spigot on said second nut fitting said socket, and a ball located in the meeting face of said second nut and entered in a segmental groove in the meeting face of said socketed nut.

3. In a twin lock nut, a nut having an undercut socket, a second nut, a conically divergent spigot on said second nut fitting said socket, and a ball located at and entered in a segmental groove in the meeting face of each said nut.

In testimony whereof I have signed my name to this specification.

WALTER CLAY PETERS.